United States Patent [19]

Hentschel et al.

[11] Patent Number: 4,666,618
[45] Date of Patent: May 19, 1987

[54] PREPARATION AND USE OF SULPHUR-CONTAINING POLYETHER-URETHANES

[75] Inventors: Karl-Heinz Hentschel, Krefeld; Siegfried Kussi; Hansjürgen Botsch, both of Leverkusen, all of Fed. Rep. of Germany

[73] Assignee: Bayer Aktiengesellschaft, Leverkusen, Fed. Rep. of Germany

[21] Appl. No.: 724,373

[22] Filed: Apr. 18, 1985

[30] Foreign Application Priority Data

Apr. 21, 1984 [DE] Fed. Rep. of Germany ....... 3415178

[51] Int. Cl.<sup>4</sup> ............................................. C10M 105/72
[52] U.S. Cl. ..................................... 252/47; 252/49.3; 156/275.5; 525/444
[58] Field of Search ..................... 156/275.5; 525/444; 252/47, 49.3

[56] References Cited

U.S. PATENT DOCUMENTS 4,336,358 6/1982 Alberts et al. ...................... 525/444
4,389,472 6/1983 Neuhaus et al. ................. 156/275.5

*Primary Examiner*—Ferris H. Lander
*Attorney, Agent, or Firm*—Sprung Horn Kramer & Woods

[57] ABSTRACT

The new sulphur-containing polyether-urethanes are prepared by a polyaddition reaction of aromatic, cycloaliphatic and/or aliphatic polyisocyanates with (a) at least one aliphatic dialcohol containing a sulphur bridge, of the formula

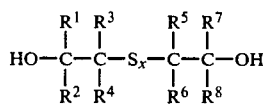

in which
R$^1$ to R$^8$ are identical or different and denote hydrogen or an alkyl radical with 1 to 10 carbon atoms and
x denotes the average number of sulphur atoms in the range from 1.5 to 4,
if appropriate in the presence of
(b) a polyethylene glycol and/or
(c) a dialcohol which carries at least one anionic group and/or at least one diamine which carries an anionic group, and, if appropriate,
(d) other cycloaliphatic, araliphatic or heterocyclic dialcohols and/or aromatic, cycloaliphatic or aliphatic diamines.

The compounds can be used as anti-wear agents in aqueous hydraulic fluids and cooling lubricant concentrates.

7 Claims, No Drawings

PREPARATION AND USE OF SULPHUR-CONTAINING POLYETHER-URETHANES

The invention relates to new sulphur-containing polyether-urethanes, a process for their preparation and their use as water-soluble antiwear and/or extreme-pressure additives in aqueous lubricant formulations, for example water-containing hydraulic fluids, such as are known from the 5th Luxemburg Report of Nov. 15, 1974, for example hydraulic fluids of the HF-C or HF-A types, or water-dilutable cooling lubricant concentrates for metalworking with and without cutting.

HF-C fluids are to be understood as lubricant formulations, for example based on aqueous polymer solutions containing at least 35% by weight of water, for an operating temperature range from $-20°$ to $+60°$ C. The water-soluble polymers here are in general polyether compounds with an average molecular weight of 350 to 200,000, such as polyalkylene glycols, in particular polyethylene glycols, polypropylene glycols, poly(ethylene oxide/copropylene oxide) copolymer diols, polyalkylene glycol esters and polyalkylene glycol amides.

HF-A fluids are oil-in-water emulsions or aqueous solutions with a combustible content of at most 20% by weight for an operating temperature range from $+5°$ to $+65°$ C. The combustible contents are corrosion inhibitors for the liquid phase and the vapor phase above the fluid, and additives which improve the lubricating film.

Cooling lubricant concentrates are water-dilutable substance mixtures of corrosion inhibitors, additives which improve the lubricating film, emulsifiers and mineral or synthetic oils.

HF-A and/or HF-C fluids are used, for example, for hydraulic power transmission and control of pumps, stamping machines and presses in mining, in driers and furnaces in the ceramics industry, in hot roll mills, in opening and closing devices for heating and melting furnaces, in injection-molding apparatuses and in transportation plants and cranes for hot zones. Practically, especially in the case of the HF-C fluids, the hydraulic system very easily fails prematurely by wear. In particular, this wear occurs at those parts of the hydraulic pump exposed to particular stress (e.g. the vane tips in a vane pump).

Water-containing cooling lubricants are as a rule used as 1- to 5-percent by weight emulsions or solutions in metalworking with or without cutting, for example turning, milling, boring or grinding (working with cutting) or rolling, drawing and the like (working without cutting).

Commercially available anti-wear additives, such as those which have proved to be particularly suitable in lubricating oils based on mineral oil, such as, for example, zinc dialkyl dithiophosphates (European Patent Application No. 0,054,804), cannot be satisfactorily added to the aqueous hydraulic fluids because of their low solubilities in water.

In addition, water-soluble anti-wear additives free from heavy metals are desirable in view of a better biological degradability of the HF-A or HF-C hydraulic fluids or water-containing cooling lubricants in the sewage plants.

The use of diethanol disulphide is also known for the field of application mentioned (German Offenlegungsschrift No. 3,008,500); however, this compound is volatile and has a strong odor.

New polyether-urethanes which can be obtained by a polyaddition reaction of aromatic, cycloaliphatic and/or aliphatic polyisocyanates with (a) at least one aliphatic dialcohol containing a sulphur bridge, of the formula

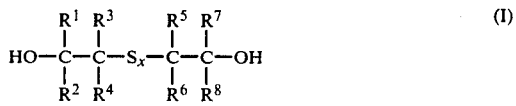

in which
R$^1$ to R$^8$ are identical or different and denote hydrogen or an alkyl radical with 1 to 10 carbon atoms and x denotes the average number of sulphur atoms in the range from 1.5 to 4, if appropriate in the presence of
(b) a polyethylene glycol and/or
(c) a dialcohol which carries at least one anionic group and/or at least one diamine which carries an anionic group, and, if appropriate,
(d) other cycloaliphatic, araliphatic or heterocyclic dialcohols and/or aromatic, cycloaliphatic or aliphatic diamines, have been found.

Surprisingly, only a very slight degree of wear occurs in aqueous hydraulic fluids containing the polyether-urethanes, with sulphur bridges, according to the invention, even in aqueous solutions of these polyether-urethanes. A customary tribological evaluation method for wear is the Reichert friction wear test such as is described by E. H. Kadmer et al. in Mineralöltechnik 3, H.2 (1958). In this method, a firmly clamped cylindrical roller is pressed, with an initial load of 15N, against a rotating hardened steel ring immersed to the lubricant test fluid. After a wear path of 100 m, the size of the concave area (scar) of wear (in mm$^2$) which has been dug into the cylindrical roller and the surface pressure borne by this concave area of wear after a wear path of 100 m ("specific load carrying capacity") in N/cm$^2$) are determined. The smaller the wear scar area and the higher the specific load carrying capacity, the better the anti-wear performance. The test fluids containing polyether-urethanes, with sulphur bridges, according to the invention surprisingly show very small wear scar areas and very high specific load carying capacities in the friction wear test. Moreover, in contrast to commercially available water-soluble extreme-pressure additives, no serious problems occur in aqueous solution with the polyether-urethanes according to the invention, even after prolonged periods of use. As a result of their excellent water-solubility, the polyether-urethanes according to the invention can be metered without problems into water-soluble hydraulic fluid formulations of very low inflammability.

In the context of the aliphatic dialcohols, containing a sulphur bridge, according to the invention, alkyl denotes a straight-chain or branched hydrocarbon radical with 1 to 10, preferably 1 to about 6, carbon atoms. The following alkyl radicals may be mentioned as examples: methyl, ethyl, propyl, isopropyl, butyl, isobutyl, pentyl, isopentyl, hexyl and isohexyl. Methyl and ethyl are particularly preferred.

The sulphur bridge is characterized by the presence of —S—S— bonds. The average number of sulphur atoms in the bridge is in general 1.5 to 4.0, preferably 1.9 to 3.1.

The aliphatic dialcohols containing a sulphur bridge are known per se (Methods der organischen Chemie (Methods of organic chemistry) (Houben-Weyl), Volume 9, Georg Thieme-Verlag, Stuttgart, 1 955, pages 55–92). They can easily be prepared, for example, by reacting the corresponding alkali metal polysulphides with chlorohydrin compounds or with epoxides, or from the corresponding epoxides, hydrogen sulphide and sulphur according to German Auslegeschrift No. 1,098,937. The dialcohols can also be a mixture of a series of analogous dialcohols with an increasing number of sulphur atoms in the sulphur bridge.

The following aliphatic dialcohols containing a sulphur bridge may be mentioned as examples: 3-thiapentane-1,5-diol (also called thiodiethanol), 3,4-dithiahexane-1,6-diol (also called dithiodiethanol), 3,4,5-trithiaheptane-1,7-diol, 3,4,5,6-tetrathiaoctane-1,8-diol, 4-thia-heptane-2,6-diol, 2-methyl-3-thiahexane-1,5-diol, 2,4-dimethyl-3-thiapentane-1,5-diol, 4,5-dithiaoctane-2,7-diol, 2-methyl-3,4-dithiaheptane-1,6-diol, 2,5-dimethyl-3,4-dithiahexane-1,6-diol, 4,5,6-trithianonane-2,8-diol, 2-methyl-3,4,5-trithiaoctane-1,7-diol, 2,6-dimethyl-3,4,5-trithiaheptane-1,7-diol, 4,5,6,7-tetrathiadecane-2,9-diol, 2-methyl-3,4,5,6-tetrathianonane-1,8-diol and 2,7-dimethyl-3,4,5,6-tetrathiaoctane-1,8-diol.

In the context of the present invention, the corresponding oligomers can also be used instead of the monomeric aliphatic dialcohols containing a sulphur bridge. The oligomers are obtained by condensation of the monomeric dialcohols containing a sulphur bridge in the presence of acid catalysts.

The oligomeric aliphatic dialcohols, containing sulphur bridges, of the formula

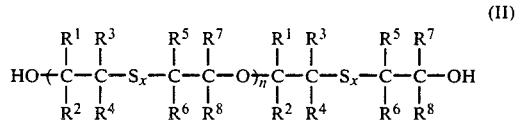

(II)

in which

R$^1$ to R$^8$ and x have the abovementioned meaning and n represents a number from 0 to 20, may be mentioned as preferred. However, the monomeric dialcohols containing a sulphur bridge (n=0) are particularly preferred.

Polyisocyanates as starting components in the context of the invention can be aliphatic, cycloaliphatic, araliphatic, aromatic or heterocyclic polyisocyanates, such as are described, for example, by W. Siefken in Justus Liebigs Annalen der Chemie, 562, pages 75 to 136, for example those of the formula A(NCO)$_n$ (III)

in which n denotes 2 to 4, preferably 2, and

A denotes an aliphatic hydrocarbon radical with 2 to 18, preferably 6 to 10, C atoms, a cycloalphatic hydrocarbon radical with 4 to 15, preferably 5 to 10, C atoms, an aromatic hydrocarbon radical with 6 to 15, preferably 6 to 13, C atoms or an araliphatic hydrocarbon radical with 8 to 15, particularly 8 to 13, C atoms, for example ethylene diisocyanate, tetramethylene 1,4-diisocyanate, hexamethylene 1,6-diisocyanate, dodecane 1,12-diisocyanate, cyclobutane 1,3-diisocyanate, cyclohexane, 1,3- and 1,4-diisocyanate and any desired mixtures of these isomers, 1-isocyanato-3,3,5-trimethyl-5-isocyanatomethyl-cyclohexane (German Auslegeschrift No. 1,202,785 and U.S. Pat. No. 3,401,190), hexahydrotoluylene 2,4- and 2,6-diisocyanate and any desired mixtures of these isomers, perhydrodiphenylmethane 2,4'- and/or 4,4'-diisocyanate, phenylene 1,3- and 1,4-diisocyanate, toluylene 2,4- and 2,6-diisocyanate and any desired mixtures of these isomers, diphenylmethane 2,4'- and/or 4,4'-diisocyanate and naphthylene 1,5-diisocyanate.

Further examples which are possible according to the invention are: triphenylmethane 4,4',4"-triisocyanate, polyphenyl-polymethylene polyisocyanates, such as are obtained by aniline/formaldehyde condensation and subsequent phosgenation and are described, for example, in British Patent Specification Nos. 874,430 and 848,671, m- and p-isocyanato-phenylsulphonyl isocyanates according to U.S. Pat. No. 3,454,606, perchlorinated aryl polyisocyanates, such as are described, for example, in German Auslegeschrift 1,157,601 (U.S. Pat. No. 3,277,138), polyisocyanates containing carbodiimide groups, such as are described in German Patent Specification No. 1,092,007 (U.S. Pat. Nos. 3,504,400, 2,537,685 and 2,552,250), norbornane diisocyanates according to U.S. Pat. No. 3,492,330, polyisocyanates containing allophanate groups, such as are described, for example, in British Patent Specification No. 994,890, Belgian Patent Specification No. 761,626 and Dutch Patent Specification No. 7,102,524, polyisocyanates containing isocyanurate groups, such as are described, for example, in U.S. Pat. No. 3,001,973, in German Patent Specification Nos. 1,022,789, 1,222,067 and 1,027,394 and in German Offenlegungsschriften Nos. 1,929,034 and 2,004,048, polyisocyanates containing urethane groups, such as are described, for example, in Belgian Patent Specification No. 752,261 or in U.S. Pat. Nos. 3,394,164 and 3,644,457, polyisocyanates containing acylated urea groups, according to German Patent Specification No. 1,230,778, polyisocyanates containing biuret groups, such as are described, for example, in U.S. Pat. Nos. 3,124,605, 3,201,372 and 3,124,605 and in British Patent Specification No. 889,050, polyisocyanates prepared by telomerization reactions, such as are described, for example, in U.S. Pat. No. 3,654,106, polyisocyanates containing ester groups, such as are mentioned, for example, in British Patent Specification No. 3,567,763 and in German Patent Specification No. 1,231,688, reaction products of the abovementioned isocyanates with acetals according to German Patent Specification No. 1,072,385, and polyisocyanates containing polymeric fatty acid esters according to U.S. Pat. No. 3,455,883.

It is also possible for the distillation residues which are obtained in the industrial production if isocyanate and contain isocyanate groups to be used, if appropriate dissolved in one or more of the above-mentioned polyisocyanates. Furthermore, any desired mixtures of the abovementioned polyisocyanates can be used.

As a rule, the polyisocyanates which are readily available commercially are preferred, for example toluylene 2,4- and 2,6-diisocyanate and any desired mixtures of these isomers ("TDI"), in particular polyphenyl polymethylene polyisocyanates, such as are prepared by aniline/formaldehyde condensation and subsequent phosgenation ("crude MDI"), 1-isocyanato-3,3,5-trimethyl-5-isocyanatomethyl-cyclohexane and polyisocyanates containing carbodiimide groups, urethane groups, allophanate groups, isocyanurate groups, urea groups or biuret groups ("modified polyisocyanates"), in particular those modified polyisocyanates which are derived from toluylene 2,4- and/or 2,6-diisocyanate or from diphenylmethane 4,4'- and/or 2,4'-diisocyanate.

Possible polyisocyanate or diisocyanate components are also prepolymers with isocyanate end groups, in the simplest case (2:1)-adducts of isocyanates on the above dialcohols containing a sulphur bridge, polyethylene glycols and/or other dialcohols.

However, polyisocyanates which are particularly preferred as the predominant polyisocyanate component (to the extent of more than 50 mol %) are diisocyanates of the formula $$B(NCO)_2 \qquad (IV)$$

in which
B denotes an aliphatic hydrocarbon radical with 6 to 10 carbon atoms, a cycloaliphatic hydrocarbon radical with 5 to 10 carbon atoms or an aromatic hydrocarbon radical with 6 to 13 carbon atoms.

The following diisocyanates may be mentioned as examples: 1,6-diisocyanatohexane, 1,10-diisocyanatodecane, 1,2-diisocyanatodecane, 1,6-diisocyanatotrimethylhexane, 1,3-diisocyanatocyclohexane, 1,4-diisocyanatocyclohexane, 1,3-bis-(isocyanatomethyl)-cyclohexane, 1,4-bis-(isocyanatomethyl)-cyclohexane, isophorone diisocyanate, 2,2-bis-(4-isocyanatocyclohexyl)-propane, bis-(4-isocyanatocyclohexyl)-methane, 4,4'-diisocyanatodicyclohexane, toluylene 2,4-diisocyanate, toluylene 2,6-diisocyanate, phenylene 1,3-diisocyanate, phenylene 1,4-diisocyanate, bis-(4-diisocyanatophenyl)-methane, 2,2-bis-(4-isocyanatophenyl)-propane, 4,4'-diisocyanatodiphenyl, naphthylene 1,5-diisocyanate and naphthylene 2,6-diisocyanate.

Polyethylene glycols in the context of the present invention can be polymers prepared by polycondensation of ethylene glycol or by polyaddition of ethylene oxide in a manner which is known per se (Ullmanns Encyklopädie der technischen Chemie (Ullmanns Encyclopaedia of Industrial Chemistry), 4th edition, Volume 19, Verlag Chemie, 1980, Weinheim, pages 31-38), with an average molecular weight in the range from about 600 to about 6,000, preferably from about 600 to about 4,000.

In the context of the present invention, it is of course also possible to use copolymer glycols of ethylene oxide with other lower epoxides and/or with tetrahydrofuran, if only small portions of the second epoxide are incorporated and the water-solubility of the polyethylene glycol is not thereby impaired. For example, such copolymers would have to contain, in copolymerized form, at least 40 mol % of ethylene oxide units in addition to $C_3$-$C_6$-epoxide units for tetrahydrofuran (tetramethyleneoxy) units, preferably at least 50 mol % and particularly preferably at least 90 mol % of ethylene oxide units. Examples of lower glycols which may be mentioned, in addition to ethylene glycol, are: 1,2-propylene glycol, 1,4-butanediol and 1,4-cyclohexanedimethanol.

Dialcohols and diamines which can be substituted by anionic groups ca be compounds of the formula $$C(OH)_2$$

or $$C(NH_2)_2 \qquad (V)$$

in which
C denotes a lower aliphatic hydrocarbon radical or an aromatic radical, which additionally also contains anionic functional groups.

Lower aliphatic hydrocarbon radicals which may be mentioned here are those with 1 to about 6 carbon atoms. Examples of these are methylene, ethylene, propylene, isopropylene, butylene, isobutylene, pentylene, isopentylene, hexylene and isohexylene.

Aromatic radicals which may be mentioned as preferred herre are phenylene, naphthylene and biphenylene.

Araliphatic, alkylaromatic or cycloaliphatic radicals and radicals which result from such dialcohols or diamines by polymerizing-on epoxides, such as ethylene oxide or propylene oxide, arre of course also possible.

Anionic groups which may be mentioned here are the sulphonate, carboxylate and phosphonate group. The dialcohols or diamines are in general substituted by 1 to 10, preferably 1 to 3, anionic groups. The following dialcohols and diamines substituted by anionic groups may be mentioned as examples: sodium butane-1,4-diol-3-sulphonate, addition products of ethylene oxide or propylene oxide (or higher epoxides) with this diol, sodium 3-hydroxy-2-ethyl-2-hydroxymethylpropionate and epoxide addition products thereof, sodium 2-(2-aminoethylamino)ethyl-sulphate, sodium hydrate (=sodium 2,6-diaminohexanoate), sodium 2,4-diaminobenzoate, sodium 2,5-diaminobenzenesulphonate and epoxide addition products with sodium 4,6-dihydroxynaphthalene-2-sulphonate or sodium 3,6-dihydroxynaphthalene-2-sulphonate.

Other dialcohols or diamines which may be mentioned are compounds of the formula $$D(OH)_2 \quad \text{or} \quad D(NH)_2 \overset{R^9}{|} \qquad (VI)$$

in which
$R^9$ denotes hydrogen or an alkyl group with 1-6 carbon atoms and
D denotes a lower aliphatic, cycloaliphatic, aromatic, araliphatic, alkylaromatic or heterocyclic radical or a radical derived from a polyalkylene oxide.

Aliphatic radicals here are straight-chain or branched hydrocarbon radicals with 1 to about 20 carbon atoms. The following aliphatic radicals may be mentioned as examples: methylene, ethylene, propylene, isopropylene, butylene, isobutylene, pentylene, isopentylene, hexylene, isohexylene and dodecylene.

Cycloaliphatic radicals here can be monocyclic or polycyclic hydrocarbon radicals with 5 to 20 carbon atoms. Examples which may be mentioned are the isomeric cyclopentylene and cyclohexylene radicals, and also divalent radicals obtained from isophoronediamine or from 4,4'-diamino-dicyclohexylmethane, the amino groups being omitted.

Aromatic radicals here can be radicals from the benzene series with 6 to 20 carbon atoms. Examples which may be mentioned are: 1,2-, 1,3- or 1,4-phenylene, naphthylene radicals and divalent radicals derived from biphenyl.

Araliphatic radicals here can be aliphatic radicals substituted by aromatic radicals, the aliphatic part denoting a straight-chain or branched hydrocarbon radical with 1 to 6 carbon atoms and the aromatic part denoting a radical from the benzene series (6 to about 12 carbon atoms), preferably phenyl. The following aralipahtic radicals may be mentioned as examples: 1-phenyl-ethane-1,2-diyl, 1,2-diphenylethane-4',4''-diyl, 2,2-diphenylpropane-4',4''-diyl and diphenylmethane-4,4'-diyl.

Alkylaromatic radicals here can be aromatic radicals of the benzene series (with in each case 6–12 carbon atoms) substituted by aliphatic radicals with in each case A1–6 carbon atoms. The following alkylaromatic radicals may be mentioned as examples: 2,4-tolylene, 2,6-tolylene and divalent xylylene radicals with linkage sites (free valences) on the aromatic ring and/or the aliphatic carbon atoms in the side chains.

Heterocyclic radicals here can be 5-membered or 6-membered cyclic radicals which also contain in the ring, in addition to carbon, other hetero-atoms, preferably oxygen, sulphur or nitrogen. The heterocyclc radicals preferably contain one or two hetero-atoms. The following heterocyclic radicals may be mentioned as examples: pyridinediyl, pyrimidinediyl, furan-2,5-dimethylene, thiophene-2,5-dimethylene and tetrahydrofuran-2,5-dimethylene.

Radicals derived from a polyalkylene oxide can be divalent radicals of the abovementioned type which are alkoxylated, or $\alpha,\omega$-polyalkylene oxide-diyls, such as $\alpha,\omega$-polyethylene oxide-diyl or $\alpha,\omega$-polypropylene oxide-diyl.

Examples which may be mentioned of other dialcohols or diamines are: aliphatic dialcohols, such as ethylene glycol, diethylene glycol, triethylene glycol, propylene glycol, dipropylene glycol, tripropylene glycol, polyethylene glycols, polypropylene glycols, butane-1,4-diol, hexane-2,5-diol, hexane-1,6-diol, decane-1,10-diol, dodecane-1,12-diol, octadecane-1,18-diol and neopentylglycol, cycloaliphatic dialcohols, such as cyclohexanediols, cyclohexanedimethanol, 4,4'-dihydroxydicyclohexyl, bis-(4-hydroxycyclohexyl)-methane and 2,2-bis-(4-hydroxycyclohexyl)-propane, aromatic dialcohols, such as bisphenols alkoxylated with small but at least equivalent amounts of ethylene oxide and/or propylene oxide, aliphatic diamines, such as ethylenediamine, N,N'-dimethyl-ethylenediamine, propylenediamine, hexamethylenediamine and 1,12-diaminododecane, cycloaliphatic diamines, such as 1,4-diaminocyclohexane, 1,4-bis-(aminomethyl)-cyclohexane, bis-(4-aminocyclohexyl)-methane, 2,2-bis-(4-aminocyclohexyl)-propane and isophoronediamine, and $\alpha,\omega$-diaminopolyethylene oxide.

In addition, it is possible also additionally to use minor amounts, that is to say less than 20 mol % of the content of other dialcohols or diamines, of monoamines, such as, for example, n-butylamine, diethylamine, aniline and the like.

The polyethers according to the invention are prepared by reacting approximately equivalent amounts, preferably 85 to 115 mol %, of the polyisocyanates, preferably only diisocyanates, with the following compounds:

(a) 30 to 95 mole %, preferably 40 to 70 mole %, of the dialcohol containing a sulphur bridge and, if appropriate, (b) 0 to 20 mole %, preferably 0 to 10 mole %, of the polyethylene glycol, and/or (c) 0 to 70 mole %, preferably 0 to 55 mole %, of the dialcohol or diamine carrying anionic groups, and/or (d) 0 to 40 mole %, preferably 0 to 20 mole %, of the dialcohol or diamine, (a) to (d) together giving 100 mole % with the proviso that (b) and (c) cannot be simultaneously 0 mole %.

The average molecular weight of the polyetherurethanes according to the invention, which can be calculated, for example, from the hydroxy numbers, is in general in the range from 800 to 100,000. However, polyether-urethanes with an average molecular weight in the range from 1,000 to 8,000 are preferred.

The polyether-urethanes according to the invention are prepared by methods analogous to the polyurethane syntheses which are known per se (Ullmanns Encyklopädie der technischen Chemie (Ullmanns Encyclopaedia of Industrial Chemistry), 4th edition, Verlag chemie, Weinheim 1980, Volume 19, pages 309–310).

The reactants are reacted in the presence of a suitable catalyst, with or without a solvent.

Solvents which may be mentioned are inert solvents containing no hydrogen which is active in Zerewitinoff reactions. Examples of solvents which may be mentioned are acetone, methyl ethyl ketone, N,N-dimethylformamide, N,N-dimethylacetamide, N-methylpyrrolidone, tetrahydrofuran and 1,4-dioxane. Low-boiling water-soluble solvents such as acetone, methyl ethyl ketone, tetrahydrofuran and dioxane are particularly preferred. However, it is also possible to use or co-use low-boiling non-polar non-protic solvents if they dissolve the polyurethanes according to the invention and form azeotropic mixtures with water when distilled off. Examples of these are benzene, toluene and xylene.

The process according to the invention is in general carried out in the temperature range from 0° to 250° C., preferably 40° to 140° C.

The process according to the invention is in general carried out under normal pressure; however, it is also possible to carry out the process under increased or reduced pressure, for example in the pressure range from 1 KPa to 10 MPa, preferably 0.05 to 0.5 MPa (1 Pa = $10^{-5}$ bar).

Possible catalysts for the addition reaction of the polyisocyanates with the diols are the organometallic compounds known to the expert, such as, for example, di-n-octyl-tin mercaptide, tin(II) acetate, tin(II) octoate, tin(II) ethylhexanoate, tin(II) laurate, dibutyl-tin oxide, dibutyl-tin dichloride, dibutyl-tin diacetate, dibutyl-tin dilaurate and dioctyl-tin diacetate, and also aminic compounds, such as tertiary aliphatic or cycloaliphatic amines, monocyclic or bicyclic amidines, ether-amines, Mannich bases, silamines, tetraalkyl-amino hydroxides, hexahydrotriamines, lactams, azalactams, aminopyridines, hydrazinopyridines and the like. The catalysts are in general used in an amount of 0.001 to 10% by weight, based on the total amount of the reactants with at least 2 hydrogen atoms which are reactive towards isocyanates.

The sulphur-containing polyether-urethanes according to the invention can be used as anti-wear additives in aqueous hydraulic fluids of the HF-A and HF-C type and in water-dilutable cooling lubricant concentrates for metalworking with or without cutting.

They are in general added in amounts of 1 to 10 parts by weight, preferably 2 to 5 parts by weight, based on 100 parts by weight of the fluid.

Preferred hydraulic fluids in the context of the present invention are aqueous polymer solutions which contain, as the thickener component, polyalkylene glycols, polyalkylene glycol esters, polyalkylene glycol-amides or polyacrylates and which can have, for example, the following composition: 40 to 95 parts by weight of water, 1 to 15 parts by weight of monomeric glycols, preferably ethylene glycol, 1 to 10 parts by weight of oligomeric glycols, preferably di- or tri-propylene glycol, 3 to 15 parts by weight of polymeric glycols, preferably tri- or tetra-functional ethylene oxide/propylene oxide adducts with molecular weights in the range from 20,000 to 25,000, 5 to 10 parts by weight of corrosion inhibitors, effective both in the aqueous and in the vapor phase, preferably fatty acid alkanolamides, arylsulphamide-carboxyic acids, benzotriazoles, fatty amine ethoxylates and morpholine, and 2 to 5 parts by weight of the anti-wear additives according to the invention.

The following sulphur-containing polyurethanes according to the invention are particularly preferred anti-wear additives for the hydraulic fluids and cooling lubricant concentrates according to the invention: polyether-urethanes consisting of (a) toluylene diisocyanates and/or isophorone diisocyanate, (b) polyethylene glycols of molecular weight 1,000–3,000, (c) propoxylated sodium butane-1,4-diol-3-sulphonate and/or
sodium 3-hydroxy-2-ethyl-2-hydroxy-methylpropionate and (d) 3,4,5-trithiaheptane-1,7-diol ("trithiodiethanol").

Hydraulic fluids and cooling lubricant concentrates with the anti-wear additives according to the invention have excellent frictional properties and are highly stable.

It will be understood that the specification and examples are illustrative but not limitative of the present invention and that other embodiments within the spirit and scope of the invention will suggest themselves to those skilled in the art.

EXAMPLE 1

The following components are reacted in 2,566 g of methyl ethyl ketone, as the solvent, at the reflux temperature (about 80° C.): 258 g (about 0.086 mole) of a polyethylene glycol which has been first dehydrated and has an average molecular weight (calculated from the hydroxy number) of 3,000, 6 g (about 0.014 mole) of a sodium 1,4-dihydroxybut-2-ylsulphonate propoxylated with about 4.1 moles of propylene oxide per mole, 167.4 g (about 0.9 mole) of a trithiodiethanol obtained from sodium trisulphide and ethylene chlorohydrin, and 174 g (1 mole) of a (65:35) mixture of toluylene 2,4-diisocyanate and toluylene 2,6-diisocyanate. After a post-reaction time of about two hours at 80° C., the reaction solution is added dropwise to 908 g of warm water of about 50° C. under reduced pressure of about 50 ∝ 65 KPa, whereupon the solvent methyl ethyl ketone distils over, mixed with some water, and a clear brownish, aqueous solution finally remains, having a solids content of about 28.4% by weight.

Characteristic values of the solid obtained therefrom: sulphur content about 15.2% by weight; hydroxy number 97 mg of KOH/g; $M_w$ (determined by light scattering) 5,400; $M_n$ (calculated from the hdyroxy number) 1,155; and number of sulphur atoms in the dialcohol 3.

EXAMPLE 2

The following substances are reacted in 2,426 g of methyl ethyl ketone, as the solvent, at the reflux temperature (about 80° C.): 219 g (about 0.073 mole) of dehydrated polyethylene glycol of an average molecular weight (calculated from the hydroxy number) of 3,000, 11.7 g (about 0.027 mole) of the same propoxylated diolsulphonate as in Example 1, 167.4 g (about 0.9 mole) of the trithiodiethanol described in more detail in Example 1 and 174 g (1 mole) of the toluylene diisocyanate mixture described in more detail in Example 1.

After a post-reaction time of four hours at 80° C., the resulting reaction solution is added dropwise to about 5,150 g of water at about 60° C. under reduced pressure of about 50–65 KPa, whereupon a methyl ethyl ketone/water mixture distils over and a yellowish-brown aqueous solution remains, having a solids content of 11.4% by weight.

Characteristic values of the solid obtained therefrom: sulphur content about 11.4% by weight; hydroxy number 40.5 mg of KOH/g; $M_w$ (determined by light scattering) 32,000; $M_n$ (calculated from the hydroxy number) 2,770; and number of sulphur atoms in the dialcohol 3.

EXAMPLE 3

A water-soluble prepolymer with isocyanate end groups and an isocyanate group content of 6.32% by weight is obtained by adding 3,385.9 g of a 30% by weight toluene solution of a propoxylated disulphonate described in more detail in Example 1 dropwise to 1,048.9 g of isophorone diisocyanate at 110° C. during 2 hours, toluene being simultaneously distilled off; the prepolymer is finely powdered and used further for this and the following examples ("sulphonate-isocyanate prepolymer").

788 g (0.9 mole) of the sulphonate-isocyanate prepolymer described above in more detail are added in portions to a mixture of 261 g (0.087 mole) of a dehydrated polyethylene glycol of an average molecular weight of 3,000, and 169.8 g (0.913 mole) of the trithiodiethanol described in more detail in Example 1 at 140° C. After a post-reaction time of three hours, the contents of the flask are poured onto a metal sheet lined with aluminum foil and, after cooling and solidifying, are comminuted and powdered to give a light brown powder.

Sulphur content about 9.9% by weight; hydroxy number 49.5 mg of KOH/g; $M_{osm.}$ 1,200; $M_n$ (from the hydroxy number) 2,270; and number of sulphur atoms in the dialcohol 3.

EXAMPLE 4

In an analogous manner to Example 3, 186 g (1 mole) of trithiodiethanol are reacted with 788 g (0.9 mole) of the sulphonate-isocyanate prepolymer described in more detail in Example 3 and, after a post-reaction time of two hours, the mixture is converted into a yellow-brown powder.

Sulphur content about 13.3% by weight; hydroxy number 67.5 mg of KOH/g; $M_{osm.}$ 950; $M_n$ (from the hydroxy number) 1,660; and number of sulphur atoms in the dialcohol 3.

EXAMPLE 5

313.2 g (0.087 mole) of a dehydrated polyethylene glycol of an average molecular weight of 3,000 and 203.8 g (0.913 mole) of the trithiodiethanol described in more detail in Example 1 are mixed at 140° C. and 119.9 g (0.45 mole) of isophorone diisocyanate are added dropwise during 2 hours, and, parallel to this, 472.8 g (0.45 mole) of the sulphonate-isocyanate prepolymer described in more detail in Example 3 are added in small portions. After a post-reaction time of three hours (the NCO number reaches 0), the mixture is poured onto a metal sheet lined with aluminum foil and is allowed to cool and broken into small lumps. These lumps are dissolved in boiling water to give an aqueous concentrate with a solids content of 14.2% by weight (yellow-brown solution).

Characteristic values of the solid: sulphur content about 11.5% by weight; hydroxy number 94 mg of KOH/g; $M_{osm.}$ 2,300; $M_n$ (from the hydroxy number) 1,190; and number of sulphur atoms in the dialcohol 3.

EXAMPLE 6

Analogously to Example 5, 391.5 g (0.087 mole) of the polyethylene glycol with a molecular weight of 3,000, 254.7 g (0.913 mole) of trithiodiethanol, 295.5 g (0.225 mole) of the sulphonate-isocyanate prepolymer described in more detail in Example 3 and 224.8 g (0.675 mole) of isophorone diisocyanate are reacted. After dissolving the mixture in water, a concentrate with a solids content of 30.2% by weight is obtained.

Characteristic values of the solid: sulphur content 10.4% by weight; hydroxy number 86.5 mg of KOH/g; $M_{osm.}$ 2,000; $M_n$ (from the hydroxy number) 1,300; and number of sulphur atoms in the dialcohol 2.0.

EXAMPLE 7

The following substances are reacted analogously to Example 3: 261 g (0.087 mole) of a dehydrated polyethylene glycol of an average molecular weight of 3,000, 155.2 g (0.913 mole) of a dithiodiethanol/trithiodiethanol mixture in a molar ratio of (1:1) (obtained by reacting ethylene chlorohydrin with a sodium polysulphide having a composition of $Na_2S_{2.5} \times H_2O$) and 788 g (0.9 mole) of the sulphonate-isocyanate prepolymer described in more detail in Example 3. After a post-reaction time of four hours, the contents of the flask are poured onto a metal sheet, broken into lumps and dissolved in water to give a 44% by weight solution.

Characteristic values of the solid: sulphur content 6.6% by weight; hydroxy number 74 mg of KOH/g; $M_n$ (from the hydroxy number) 1,515; and number of sulphur atoms in the dialcohol 2.5.

EXAMPLE 8

The following substances are reacted analogously to Example 3: 261 g (0.087 mole) of a dehydrated polyethylene glycol of an average molecular weight of 3,000, 140.6 g (0.913 mole) of dithiodiethanol(=bis(2-hydroxyethyl)disulphide) and 788 g (0.9 mole) of the sulphonate-isocyanate prepolymer described in more detail in Example 3. After a post-reaction time of four hours, the procedure followed is likewise as in Example 7 and a 38.5% by weight brownish-yellow aqueous solution is obtained.

Characteristic values of the solid: sulphur content of the solid 6.6% by weight; hydroxy number 63 mg of KOH/g; $M_n$ (from the hydroxy number) 1,780; and number of sulphur atoms in the dialcohol 2.0.

EXAMPLE 9

The following substances are reacted analogously to Example 3: 261 g (0.087 mole) of a dehydrated polyethylene glycol of an average molecular weight of 3,000, 70.3 g (0.4565 mole) of bis-(2-hydroxyethyl)disulphide, 55.7 g (0.4565 mole) of bis-(2-hydroxyethyl)sulphide and 788 g (0.9 mole) of the sulphonate-isocyanate prepolymer described in more detail in Example 3. After a post-reaction time of 3 hours and working up as in Example 7, a 38.3% by weight yellow aqueous solution results.

Characteristic values of the solid: sulphur content 5.3% by weight; hydroxy number 95 mg of KOH/g; $M_n$ (from the hydroxy number) 1,180; and number of sulphur atoms in the dialcohol 1.5.

EXAMPLE 10

(Comparison experiment)

The following compounds are reacted analogously to Example 3: 261 g (0.087 mole) of a dehydrated polyethylene glycol of an average molecular weight of 3,000, 111.4 g (0.913 mole) of bis-(2-hydroxyethyl)sulphide and 788 g (0.9 mole) of the sulphonate-isocyanate prepolymer described in more detail in Example 3. After a post-reaction time of three hours and working up as in Example 7, a 38.8% by weight straw-yellow aqueous solution results.

Characteristic values of the solid: sulphur content 4.3% by weight; hydroxy number 92 mg of KOH/g; $M_n$ (from the hydroxy number) 1,220; and number of sulphur atoms in the dialcohol 1.0.

EXAMPLE 11

The following substances are reacted analogously to Example 3: 261 g (0.087 mole) of a dehydrated polyethylene glycol of an average molecular weight of 3,000, 192.6 g (0.913 mole) of a polythiodiethanol which has been obtained from $Na_2S_{3.5} \times H_2O$ and ethylene chlorohydrin and, according to analysis, has an average composition of $HOC_2H_4-S_{3.7}-C_2H_4$, and 788 g (0.9 mole) of the sulphonate-isocyanate prepolymer described in more detail in Example 3. After a post-reaction time of three hours and working up as in Example 7, a 29.0% by weight brown aqueous solution is obtained.

Characteristic values of the solid: sulphur content 10.1% by weight; hydroxy number 88 mg of KOH/g; $M_n$ (from the hydroxy number) 1,275; and x (in general formua I) 3.7.

EXAMPLE 12

The following substances are reacted analogously to Example 3: 261 g (0.087 mole) of a dehydrated polyethylene glycol of an average molecular weight of 3,000, 195.8 g (0.913 mole) of a polythiodiethanol which has been obtained from $Na_2S_4 \times H_2O$ and ethylene chlorohydrin and, according to analysis, has an average composition of $HOC_2H_4-S_{3.8}-C_2H_4OH$, and 788 g (0.9 mole) of the sulphonate-isocyanate prepolymer described in more detail in Example 3. After a post-reaction time of three hours and working up as in Example 7, a 27.9% by weight brown aqueous solution is obtained.

Characteristic values of the solid: sulphur content 10.8% by weight; hydroxy number 92 mg of KOH/g; $M_n$ (from the hydroxy number) 1,220; and number of sulphur atoms in the dialcohol 3.8.

EXAMPLE 13

This example shows that dialcohols containing carboxylate groups can also advantageously be incorporated into the polyether-urethanes according to the invention and the polyisocyanates can also be reacted in blocked form.

The following substances are reacted: 261 g (0.087 mole) of a dehydrated polyethylene glycol of an average molecular weight of 3,000, 169.8 g (0.913 mole) of trithiodiethanol and 736.2 g (0.9 mole) of a (2:1) adduct, blocked with caprolactam, of isophorone diisocyanate and 3-hydroxy-2-methyl 2-hydroxymethylpropionic acid ("dimethylolpropionic acid"). These constituents are stirred under a waterpump vacuum at 140° C. for about 6 hours, caprolactam passing over. After cooling, the dark brown solid is dissolved in aqueous sodium hydroxide solution (30.8 g of NaOH per 1,000 g of resin) to give a concentrate with a solids content of 58.1% by weight.

Characteristic values of the solid: sulphur content: 7.1% by weight; $M_{os}$ 900; and number of sulphur atoms in the dialcohol 3.0.

EXAMPLE 14

The following substances are reacted analogously to Example 3: 261 g (0.087 mole) of a dehydrated polyether-glycol of an average molecular weight of 3,000, 180.8 g (0.913 mole) of a "trithiodipropanol" (=mixture of 4,5,6-trithianonane-2,8-diol, 2-methyl-3,4,5-trithiaoctane-1,7-diol and 2,6-dimethyl-3,4,5-trithiaheptane-1,7-diol) obtained by reacting 2 moles of propylene oxide with 1 mole of H$_2$S and 2 moles of sulphur according to German Auslegeschrift No. 1,098,937, and 788 g (0.9 mole) of the sulphonate-isocyanate prepolymer described in more detail in Example 3. After a reaction time of about four hours at 140° C., the NCO number has decreased to 0% of NCO. A solution with a solids content of 63.8 percent by weight is obtained by dilution with water.

Sulphur content 6.9 to 7.01% by weight; hydroxy number 84.5 mg of KOH/g; $M_n$ (from the hydroxy number) 1,310; and number of sulphur atoms in the dialcohol 3.0.

EXAMPLE 15

The following compounds are reacted analogously to Example 3: 261 g (0.087 mole) of a dehydrated polyethylene glycol of an average molecular weight of 3,000, 219.1 g (0.913 mole) of a mixture of 5,6,7-trithiaundecane-3,9-diol, 2-ethyl-3,4,5-trithianonane-1,7-diol and 2,6-diethyl-3,4,5-trithiaheptane-1,7-diol, obtained by reacting 2 moles of 1,2-epoxybutane with 1 mole of H$_2$S and 2 moles of sulphur according to German Auslegeschrift No. 1,098,937, and 788 g (0.9 mole) of the sulphonate-isocyanate prepolymer described in more detail in Example 3. After a reaction time of about four hours at 140° C., the NCO number is 0%. A solution with a solids content of 65.8 percent by weight is obtained by dilution with water.

Sulphur content 8.23 to 8.48% by weight; hydroxy number 37 mg of KOH/g; $M_n$ (from the hydroxy number) 3,030; and number of sulphur atoms in the dialcohol 3.0.

EXAMPLE 16

The following substances are reacted analogously to Example 3: 261 g (0.087 mole) of a dehydrated polyethylene glycol of an average molecular weight of 3,000, 425.5 g (0.913 mole) of a mixture of 13,14,15-trithiaheptacosane-11,17-diol, 11-hydroxymethyl-12,13,14-trithiahexacosan-16-ol and 11,15-bis-(hydroxymethyl)-12,13,14-trithiapentacosane obtained by reacting 2 moles of 1,2-epoxydodecane with 1 mole of H$_2$S and 2 moles of sulphur according to German Auslegeschrift No. 1,098,937, and 788 g (0.9 mole) of the sulphonate-isocyanate prepolymer described in more detail in Example 3. A solution with a solids content of 64.1% by weight is obtained analogously by dilution with water.

Sulphur content 7.16–7.36% by weight; hydroxy number 61 mg of KOH/g; $M_n$ (from the hydroxy number) 1,840; and number of sulphur atoms in the dialcohol 3.0.

EXAMPLE 17

The following substances are reacted analogously to Example 3: 261 g (0.087 mole) of a dehydrated polyethylene glycol with a molecular weight of 3,000, 169.8 g (0.913 mole) of trithiodiethanol (3,4,5-trithiaheptane-1,7-diol) and 701.6 g (0.9 mole) of a sulphonate-isocyanate prepolymer obtained by addition of 2 moles of toluylene diisocyanate (65% by weight of the 2,4-isomer and 35% by weight of the 2,6-isomer) onto 1 mole of the diolsulphonate mentioned in Example 1.

Yield 1,350.6 g (99.4% by weight); sulphur content 8.62–9.02% by weight; hydroxy number 93.5 mg of KOH/g; $M_{osm.}=750$ (in N,N-dimethylformamide); $M_n$ (from the hydroxy number) 1,200; and number of sulphur atoms in the dialcohol 3.0.

EXAMPLE 18

The preparation proceeds virtually analogously to Example 3 with two differences: (a) a material obtained from 2 moles of ethylene oxide, 1 mole of H$_2$S and 2 moles of sulphur according to German Auslegeschrift No. 1,098,937 is used as the trithiodiethanol, and (b) the sulphonate-isocyanate prepolymer is prepared from the disulphonate and the diisocyanate by reaction in toluene at 25° (in the presence of 0.2% by weight of 1,4-diazabicyclo[2.2.2]octane). A solution with a solids content of 63.9% by weight is obtained therefrom by dilution with water.

Sulphur content 10.2–10.7% by weight; hydroxy number 96.5 mg of KOH/g; $M_{osm.}=2,300$; $M_n$ (from the hydroxy number) 1,163; and number of sulphur atoms in the dialcohol.3.0.

All the products of Examples 1 to 18 are water-miscible, and in particular
Example 1: emulsifiable
Example 2: emulsifiable
Example 3: clearly soluble
Example 4: clearly soluble
Exaple 5: emulsifiable
Example 6: emulsifiable
Example 7: clearly soluble
Example 8: clearly soluble
Example 9: clearly soluble
Example 10: clearly soluble
Example 11: emulsifiable
Example 12: emulsifiable
Example 13: emulsifiable
Example 14: clearly soluble
Example 15: clearly soluble
Example 16: emulsifiable
Example 17: clearly soluble
Example 18: clearly soluble.

USE EXAMPLES

The following tests document the improvement in the lubricity of the sulphur-containing polyurethane systems according to the invention as additives to water-containing lubricating fluids.

The values at the critical load which are summarized in Table 1 are obtained for aqueous solutions of the products (Examples 1-12) on the Almen-Wieland testing machine (M. Brunner and R. Pedrini, Schweizer Archiv Annales Suisse, Volume 21 (1955) No. 6, pages 169-177; and Volume 21 (1955) No. 8, pages 251-257).

Using the same test solutions, the measurement results summarized in Table 2 were obtained in the Reichert friction wear test (E. Kadmer and H. Denninger, Schmierungstechnik, Volume 7 (1960) No. 5, pages 223-228).

TABLE 1

| | Almen-Wieland test | | |
|---|---|---|---|
| Example | % by weight of the product in water | welding force (N) | Friction force (N) | Temperature °C. |
| — | 0 | 500 | cannot be determined | 25 |
| 1 | 1 | >20000 | 1530 | 76 |
| | 2 | >20000 | 1610 | 78 |
| | 5 | >20000 | 1170 | 74 |
| 2 | 1 | >20000 | 1180 | 65 |
| | 2 | >20000 | 1160 | 68 |
| | 5 | >20000 | 1490 | 74 |
| 3 | 1 | >20000 | 1350 | 72 |
| | 2 | >20000 | 1600 | 93 |
| | 5 | >20000 | 1480 | 94 |
| 4 | 1 | >20000 | 1350 | 76 |
| | 2 | 19500 | 3500 | 100 |
| | 5 | >20000 | 3330 | 90 |
| 5 | 1 | >20000 | 1850 | 90 |
| | 2 | >20000 | 1730 | 86 |
| | 5 | >20000 | 2500 | 93 |
| 6 | 1 | >20000 | 1650 | 85 |
| | 2 | >20000 | 1700 | 85 |
| | 5 | >20000 | 2300 | 90 |
| 7 | 1 | >20000 | 1750 | 87 |
| | 2 | >20000 | 1650 | 82 |
| | 5 | >20000 | 1450 | 84 |
| 8 | 1 | >20000 | 1650 | 89 |
| | 2 | >20000 | 1650 | 85 |
| | 5 | >20000 | 1700 | 88 |
| 9 | 1 | >20000 | 1150 | 68 |
| | 2 | >20000 | 1700 | 88 |
| | 5 | >20000 | 1750 | 89 |
| 10 | 1 | 7000 | 1650 | 66 |
| | 2 | >20000 | 1850 | 90 |
| | 5 | >20000 | 1750 | 92 |
| 11 | 1 | >20000 | 1200 | 72 |
| | 2 | >20000 | 1400 | 71 |
| | 5 | >20000 | 1450 | 84 |
| 12 | 1 | >20000 | 1300 | 71 |
| | 2 | >20000 | 1300 | 72 |
| | 5 | >20000 | 1400 | 83 |
| 13 | 1 | 13000 | 1600 | 77 |
| | 2 | 19500 | >3500 | 89 |
| | 5 | >20000 | 1590 | 84 |
| 14 | 1 | >20000 | 2030 | 89 |
| | 2 | >20000 | 2100 | 90 |
| | 5 | >20000 | 2300 | 93 |
| 15 | 1 | >20000 | 1700 | 80 |
| | 2 | >20000 | 2040 | 89 |
| | 5 | >20000 | 1980 | 89 |
| 16 | 1 | >20000 | 1980 | 86 |
| | 2 | >20000 | 2090 | 86 |
| | 5 | >20000 | 2010 | 90 |
| 17 | 1 | >20000 | 2050 | 78 |
| | 2 | >20000 | 2000 | 83 |
| | 5 | >20000 | 2000 | 84 |
| 18 | 1 | >20000 | 1650 | 77 |
| | 2 | >20000 | 1630 | 77 |
| | 5 | >20000 | 1490 | 76 |

TABLE 2

| | Reichert friction wear test (at 15 N load) | |
|---|---|---|
| Example | % by weight of the product in water | Specific load carrying capacity (N/cm$^2$) |
| — | 0 | 1050 |
| 1 | 1 | 2850 |
| | 2 | 9090 |
| | 5 | 9670 |
| 2 | 1 | 6470 |
| | 2 | 7140 |
| | 5 | 7030 |
| 3 | 1 | 3870 |
| | 2 | 5070 |
| | 5 | 10050 |
| 4 | 1 | 11300 |
| | 2 | 7990 |
| | 5 | 11200 |
| 5 | 1 | 3630 |
| | 2 | 4270 |
| | 5 | 6790 |
| 6 | 1 | 11580 |
| | 2 | 21030 |
| | 5 | 20480 |
| 7 | 1 | 2270 |
| | 2 | 2920 |
| | 5 | 9850 |
| 8 | 1 | 2100 |
| | 2 | 2770 |
| | 5 | 6270 |
| 9 | 1 | 1920 |
| | 2 | 1980 |
| | 5 | 3030 |
| 10 | 1 | 2420 |
| | 2 | 2640 |
| | 5 | 4340 |
| 11 | 1 | 13680 |
| | 2 | 15030 |
| | 3 | 9480 |
| 12 | 1 | 3720 |
| | 2 | 11260 |
| | 5 | 10470 |
| 13 | 1 | 3410 |
| | 2 | 5300 |
| | 5 | 18110 |
| 14 | 1 | 3270 |
| | 2 | 4280 |
| | 5 | 7800 |
| 15 | 1 | 2590 |
| | 2 | 6320 |
| | 5 | 4460 |
| 16 | 1 | 3070 |
| | 2 | 2940 |
| | 5 | 3870 |
| 17 | 1 | 2520 |
| | 2 | 3000 |
| | 5 | 3570 |
| 18 | 1 | 2590 |
| | 2 | 3090 |
| | 5 | 4000 |

In Table 3, the frictional properties of tap water (1.), a commercially available HF-C hydraulic fluid (2.) and commercially available cooling lubricants (use solutions, 2% strength)—mineral oil emulsion (3.) and fully synthetic product (4.)—are summarized for comparison.

TABLE 3

| | Almen-Wieland test | | | Reichert Friction wear test (at 15 N load) specific load carrying capacity N/cm$^2$ |
|---|---|---|---|---|
| | Welding force (N) | Friction force (N) | Temp. (°C.) | |
| 1. Water | 500 | * | 25 | 1,050 |
| 2. HF-C fluid, commercially available | 20,000 | 2,700 | 94 | 3,443 |
| 3. Cooling lubricant | 6,500 | 1,400 | 46 | 1,230 |

TABLE 3-continued

| | Almen-Wieland test | | | Reichert Friction wear test (at 15 N load) specific load carrying capacity N/cm² |
|---|---|---|---|---|
| | Welding force (N) | Friction force (N) | Temp. (°C.) | |
| use solution (mineral oil emulsion) | | | | |
| 4. Cooling lubricant use solution (fully synthetic product) | 3,500 | 1,450 | 42 | 1,950 |

*cannot be determined

We claim:

1. A polyurethane obtainable by a polyaddition reaction of an aromatic, cycloalkane or alkane polyisocyanate with
   (a) at least one aliphatic dialcohol containing a sulphur bridge, of the formula

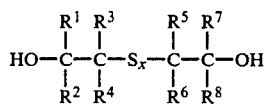

in which
   $R^1$ to $R^8$ each independently is hydrogen or an alkyl radical with 1 to 10 carbon atoms, and
   X is the average number of sulphur atoms in the range from 1.5 to 4,
   and at least one of
   (b) a polyethylene glycol, and
   (c) a dialcohol which carries at least one anionic group and/or at least one diamine which carries an anionic group.

2. A polyurethane according to claim 1, wherein the material to which the polyisocyanate is added further includes
   (d) at least one other cycloalkane, aralkane or heterocyclic dialcohol and/or aromatic, cycloalkane or alkane diamine.

3. A polyether-urethane according to claim 1, in which
   $R^1$ to $R^8$ each independently is hydrogen, methyl or ethyl, and
   X is the average number of sulphur atoms in the range from 1.9 to 3.1.

4. A polyether-urethane according to claim 1, having an average molecular weight in the range from 800 to 100,000.

5. A polyether-urethane according to claim 1, wherein the material to which the polyisocyanate is added comprises
   (a) 30 to 95 mol % of the dialcohol containing a sulphur bridge,
   (b) 0 to 20 mol % of a polyethylene glycol,
   (c) 0 to 70 mol % of a dialcohol carrying at least one anionic group and/or at least one monoamine or diamine carrying an anionic group, and
   (d) 0 to 40 mol % of another cycloalkane, aralkane or heterocyclic dialcohol and/or aromatic, cycloalkane or alkane diamine,
   (a) and (d) together totaling 100 mol %, the polyisocyanate being employed in 85 to 115 mol % of (a) to (d), with the proviso that (b) and (c) do not simultaneously equal 0.

6. In a hydraulic fluid or cooling lubricant system containing an additive for improved anti-wear properties, the improvement wherein such additive comprises a polyurethane according to claim 1.

7. An aqueous polymer solution composition comprising
   40 to 95 parts by weight of water,
   1 to 15 parts by weight of monomeric glycols,
   1 to 10 parts by weight of oligomeric glycols,
   3 to 15 parts by weight of polymeric glycols,
   5 to 10 parts by weight of corrosion inhibitors, effective both in the aqueous and in the vapor phase and
   2 to 5 parts by weight of the polyurethane according to claim 1.

* * * * *